US011126793B2

(12) United States Patent
Gkotsoulia et al.

(10) Patent No.: US 11,126,793 B2
(45) Date of Patent: Sep. 21, 2021

(54) UNSUPERVISED INDUCTION OF USER INTENTS FROM CONVERSATIONAL CUSTOMER SERVICE CORPORA

(71) Applicant: Omilia Natural Language Solutions Ltd., Limassol (CY)

(72) Inventors: Paraskevi Gkotsoulia, Athens (GR); Konstantinos Gkikas, Athens (GR)

(73) Assignee: Omilia Natural Language Solutions Ltd., Limassol (CY)

( * ) Notice: Subject to any disclaimer, the term of this patent is extended or adjusted under 35 U.S.C. 154(b) by 20 days.

(21) Appl. No.: 16/593,154

(22) Filed: Oct. 4, 2019

(65) Prior Publication Data

US 2021/0103634 A1 Apr. 8, 2021

(51) Int. Cl.
*G06F 17/00* (2019.01)
*G06F 40/211* (2020.01)
(Continued)

(52) U.S. Cl.
CPC .......... *G06F 40/211* (2020.01); *G06F 16/355* (2019.01); *G06F 40/163* (2020.01);
(Continued)

(58) Field of Classification Search
CPC .... G06F 40/211; G06F 16/355; G06F 40/284; G06F 40/186; G06F 40/30; G06F 40/163
See application file for complete search history.

(56) References Cited

U.S. PATENT DOCUMENTS 5,414,755 A 5/1995 Bahler et al.
8,942,986 B2 * 1/2015 Cheyer ............... G06F 16/3329
704/275
(Continued)

FOREIGN PATENT DOCUMENTS

EP 1507394 2/2005
EP 3543874 9/2019
(Continued)

OTHER PUBLICATIONS

Nicolaou, C. et al.,"Where Is My Parcel? Fast and Efficient Classifiers to Detect User Intent in Natural Lanugage," 2019 6th Intl. Conf. on Social Networks Analysis, Management and Security (SNAMS), IEEE, pp. 351-356.*
(Continued)

*Primary Examiner* — Cesar B Paula
*Assistant Examiner* — James H. Blackwell
(74) *Attorney, Agent, or Firm* — White & Case LLP

(57) ABSTRACT

A methodology and system are presented for inducing user intent in a corpus and storing this intent in an intent library. To accurately detect intent, the corpus is first cleaned of nonsensical words and symbols and then syntactically analyzed to extract words and dependencies between them, which are then semantically analyzed to select keywords that are indicative of intent, and map the keywords to ordered broad semantic categories of the types of action, modifier and object. Keywords are then converted into embedding vectors whose dimensions are reduced and clustered according to category and order. Relations are calculated for the clusters across the semantic categories and intent is then calculated with the help of intent templates and word dictionaries.

25 Claims, 12 Drawing Sheets

(51) Int. Cl.
    *G06F 16/35*     (2019.01)
    *G06F 40/30*     (2020.01)
    *G06F 40/163*     (2020.01)
    *G06F 40/186*     (2020.01)
    *G06F 40/284*     (2020.01)

(52) U.S. Cl.
    CPC .......... *G06F 40/186* (2020.01); *G06F 40/284* (2020.01); *G06F 40/30* (2020.01)

(56) References Cited

U.S. PATENT DOCUMENTS

| | | | |
|---|---|---|---|
| 10,339,452 B2* | 7/2019 | Romano | G06N 5/022 |
| 10,679,134 B2* | 6/2020 | Romano | G06N 5/022 |
| 2005/0105712 A1* | 5/2005 | Williams | H04M 3/5166 |
| | | | 379/265.02 |
| 2011/0238408 A1* | 9/2011 | Larcheveque | G06F 40/284 |
| | | | 704/9 |
| 2013/0110520 A1* | 5/2013 | Cheyer | G06F 40/40 |
| | | | 704/275 |
| 2013/0132091 A1 | 5/2013 | Skerpac | |
| 2014/0025705 A1* | 1/2014 | Barve | G06F 16/2457 |
| | | | 707/771 |
| 2014/0222419 A1* | 8/2014 | Romano | G06N 5/022 |
| | | | 704/10 |
| 2016/0372116 A1 | 12/2016 | Summerfield | |
| 2017/0075935 A1 | 3/2017 | Lagos et al. | |
| 2019/0026760 A1* | 1/2019 | Hwang | G06F 16/958 |
| 2019/0251417 A1* | 8/2019 | Bennett | G06N 20/00 |
| 2019/0295535 A1* | 9/2019 | Sapugay | G06N 5/025 |
| 2019/0325324 A1* | 10/2019 | Romano | G06F 16/367 |
| 2019/0370396 A1* | 12/2019 | Agnihotram | G06N 3/08 |
| 2019/0386917 A1* | 12/2019 | Malin | H04L 69/329 |
| 2020/0066255 A1* | 2/2020 | Madan | G10L 15/1815 |

FOREIGN PATENT DOCUMENTS

| | | |
|---|---|---|
| WO | WO-2007051109 A1 | 5/2007 |
| WO | WO-2011119171 A1 | 9/2011 |

OTHER PUBLICATIONS

Zhang, H. et al.,"Generic Intent Representation in Web Search," 2019, ACM, 10 pages.*

Zhing, J. et al.,"Predicting Customer Call Intent by Analyzing Phone Call Transcripts Based on Cnn for Multi-Class Classification," Marchex, Inc., 2019, pp. 09-20.*

Qu, C. et al.,"User Intent Prediction in Information-Seeking Conversations,"CHHR '19 Mar. 10-14, 2019, Glasgow Scotland, ACM, 9 pages.*

Papalkar, S. et al.,"A Review of Dialogue Intent Identification Methods for Closed Domain Conversational Agents," IEEE, 2018, pp. 566-570.*

Pappu, A. et al.,"Method and System for Providing Semi-Supervised User Intent Detection for Multi-Domain Dialogues," IP.com Prior Art Database Technical Disclosure, Yahoo! 2017, 6 pages total.*

* cited by examiner

| Utterances | Clusters |
|---|---|
| a balance on a credit | 91 |
| a bank card | 61 |
| a banking token | 36 |
| a business | 36 |
| a business card | 39 |
| a call that | 65 |
| a cancellation | 46 |
| ... | |

UNSUPERVISED INDUCTION OF USER INTENTS FROM CONVERSATIONAL CUSTOMER SERVICE CORPORA

FIELD

The present application relates to systems, devices, apparatuses and methods of analyzing dialogue. More particularly, the application relates to determining user intent from conversational dialogue.

BACKGROUND

Humans have developed very complex linguistic and mental skills during their evolution. Such skills are routinely used when interacting with one another and more recently with computer-based systems. One may consider a human asking a simple question like "what is my account balance" to a bank clerk or via a phone banking system to a human operator, or a computer. The user may use his voice, while in alternative scenarios he may type his question in a graphical box of a chat-based interface. There are numerous ways the same (or other) human may ask the same question, like "I would like to know my credit account balance please", "what's my balance", "how much money is still in my deposit account", etc. These variations can grow exponentially if, for example, a user has different types of accounts and/or if his input contains words that are not directly related to his request or are semantically empty (e.g. "em . . . ", "hm . . . ", "well . . . ").

Detecting the user's intent, i.e. "to find out his account balance", is complicated enough for a human operator, as he would first have to identify the useful part of the user's utterance and then try to make sense out of it (e.g. linguistically and/or by combining context and other related information on the accounts the user possesses etc.), so as to service the user's request.

This operation has a complexity many orders higher when serviced by a computer-based system, as the system does not possess the intelligence of the average human. In recent years, significant developments have been made in automated speech processing and text analysis and lately, methods have been proposed to use such analysis to identify user intent. Such methods are based on modeling natural language using statistical and other mathematical methods. They typically involve human supervision in at least some of their method steps like, for instance, dataset labeling for training algorithms for intent classification.

Automatic intent induction systems that require labeled datasets are tailored to the specific needs of narrowly defined use cases and domains (e.g. banking or retail), while outside such pre-defined use, system efficacy, accuracy and speed of operation are seriously hampered. As a result, when the domain changes, such systems either need serious parameterization involving heavy human intervention or their performance and output is of no practical value. In addition, labeled datasets limit the use of such systems to a specific language, which further complicates the situation.

It is apparent from the above limitations that an accurate, efficient, and scalable method is needed to automatically identify user intent in unconstrained contexts. Such method can make use of automatically compiled libraries of user intents, available for use in real time intent detection, i.e. during user interactions with computer-based systems without altering the usual user routine when verbally or textually interacting with such systems. There is, therefore, a need to automatically build and/or update user intent libraries.

SUMMARY

The present application relates to systems, devices, apparatuses and methods of automatically inducing user intent in unstructured conversational (dialogue) corpora. The application leverages various techniques within the fields of speech processing, natural language processing, artificial intelligence, and machine learning. More precisely, the application relies on the combined use of grammatical knowledge (acquired from syntactic parsing models) and lexical knowledge (acquired from distributional semantics models referred to as vector space models) to cluster user utterances in coherent intent groups and induce explicit descriptions of the semantic components of intents. The present application includes an innovative solution aimed at creating and updating intent libraries for use in identification of the intent of a user interacting with a human agent or a computer system. Before detecting the user's intent in a corpus, the present solution assumes that speech is converted to text, if the user interacts in uttered speech.

The corpus is preprocessed using language models and/or word dictionaries to remove words and symbols with no linguistic value. A sentence segmentation model identifies sentence boundaries in the clean corpus, which is subsequently analyzed with a syntactic model. The latter identifies binary relations (dependencies) between words, on top of part-of-speech tags.

Semantic analysis follows to select keywords that convey user's intent, and map the keywords to semantic categories, or keyword types (Actions, Modifiers, Objects). The dependencies between keywords are projected to dependencies between keyword types and the latter are combined in so-called AMO triplets that are used to represent the meaning of each corpus sentence. AMO triplets are populated with keywords while the model keeps track of the dependencies between them. In certain implementations, one user intent is semantically equivalent to at least one AMO triplet.

Keywords are then converted into embeddings vectors and the vector dimensions are reduced before the vectors are clustered. Clustering of keyword vectors takes place inside each semantic category (keyword type) at each AMO level and lists of semantically related words (i.e. keyword dictionaries) are output. Keyword relations (dependencies) are projected to cluster relations inside and across AMO levels. The clusters and their relations are used to create intent templates that are equivalent to semantic descriptions of intents. Empty slots in the templates are filled with lexical entries from the automatically acquired keyword dictionaries.

In a variation of the above methodology, sentence embeddings are calculated from keyword embeddings using one of a set of proposed methods. The sentence embeddings are then clustered in coherent groups, which also represent intents.

In yet another exemplary implementation, sentence clusters are used to validate the intent semantic structure produced from keyword clusters and their relations and, therefore, increase accuracy and performance of the calculation method resulting in improved intent libraries.

The intents in the updated intent library are then made available for user intent induction during the user's interaction with any third party system. To facilitate this interaction, the identified user intent is mapped onto one or more actions, which are sent to the third party system or application.

In one aspect, a system for updating an intent library includes a syntactic parser arranged to process a sequence of word tokens and control characters of at least one sentence in a corpus and produce words and dependencies between the words. The system also includes a semantic analyzer arranged to process the words and dependencies between the words for extracting a set of keywords and arranged to map the keywords to action (A), modifier (M) and object (O) semantic categories and create ordered AMO triplets. The system further includes an embeddings processor arranged to convert the extracted keywords in the ordered AMO triplets into keyword embedding vectors and reduce the dimensions of the keyword embedding vectors in each of the action, modifier and object semantic category and in each order of the AMO triplets. The system includes a clustering processor arranged to cluster the reduced dimension keyword embedding vectors, where each keyword cluster contains semantically similar keywords, and which keywords in a cluster express a single intent. System also includes an intent calculator arranged to calculate cluster relations, create intent templates, fill empty positions in the intent templates, and store the intent clusters and the intents the clusters represent to the intent library.

In some configurations, the system includes a pre-processor arranged to eliminate words and marks that have no linguistic value from a corpus, and arranged to create a sequence of word tokens and pairs of sentence boundary control characters, where the corpus comprises at least one sentence. The intent calculator may be arranged to validate the intent semantic structure. The intent calculator may be configured to assign intent labels to intent clusters and store the intent labels to the intent library.

In some implementations, any one of, portion of, or grouping of the pre-processor, the syntactic parser, the semantic analyzer, the embeddings processor, the clustering processor, or the intent calculator may be implemented in one of an application server, a user device, a multi-processor system, a multicore-processor, and a multi-processor system where each processor is a multi-core processor. The system may include an action processor arranged to map each intent onto one or more actions and output each actions to at least one external system.

Another aspect includes a server configured to cluster keywords. The server includes a communications interface arranged to received text from at least one of an automated speech recognition (ASR) module and a user interface, the text forming at least one sentence in a corpus. The server also includes a processor arranged to: syntactically parse a sequence of word tokens and control characters of the at least one sentence in the corpus to produce words and dependencies between the words; semantically analyze the words and dependencies between the words for extracting a set of keywords and means to map the keywords to action (A), modifier (M) and object (O) semantic categories and create ordered AMO triplets; convert the extracted keywords in the ordered AMO triplets into keyword embedding vectors and reduce the dimensions of the keyword embedding vectors in each of the action, modifier and object semantic category and in each order of the AMO triplets; and cluster the reduced dimension keyword embedding vectors, where each keyword cluster contains semantically similar keywords, and which keywords in a cluster express a single intent.

In some implementations, the processor is configured to: i) eliminate words and marks that have no linguistic value from the corpus, and ii) create the sequence of word tokens and pairs of sentence boundary control characters. In some implementations, the processor is configured to calculate cluster relations, create intent templates, fill empty positions in the intent templates, and store the intent clusters and the intents the clusters represent to an intent library. The processor may also be configured to assign intent labels to intent clusters, which labels are found in the intent library and store the intent labels to the intent library.

In a further aspect, a computer implemented method for updating an intent library includes a portion of or all of the following steps: pre-processing a corpus to eliminate words and symbols that have no linguistic value, where the corpus comprises at least one sentence, and to create a sequence of word tokens and pairs of sentence boundary control characters; syntactically processing the sequence of tokens to produce a grammatical-syntactical representation of the at least one sentence in the corpus; semantically processing the grammatical/syntactical representation of the at least one sentence in the corpus to extract a set of keywords; mapping each extracted keyword to one of action (A), modifier (M) and object (O) semantic category; representing the order of appearance of the extracted keywords as different levels of actions (A), modifiers (M) and objects (O); calculating binary relations between the extracted keywords; combining and prioritizing the binary relations into ordered AMO triplets, where each AMO triplet describes one intent and contains at least one keyword; converting the extracted keywords in the ordered AMO triplets into keyword embedding vectors; mapping the extracted keywords in the ordered AMO triplets onto an embedding space, where each keyword is converted to an n-dimensional embedding vector; reducing the dimensions of the keyword embedding vectors in each of the action, modifier and object semantic category and in each of the ordered AMO triplets; clustering the keyword embedding vectors, where each cluster contains semantically similar keywords; creating cluster combinations, where each clusters combination represents a single intent; and entering the cluster combinations into the intent library.

With respect to patent eligibility, the above aspects should not be considered directed to an abstract idea. Instead, the above aspects should be considered directed to an Internet-centric problem or improvement of computer technology related to more efficient automatic determinations of user intent from conversation dialogues that advantageously reduces memory and processing demands on corpora analysis system. By converting extracted keywords from a corpora into ordered AMO triplets to create keyword clusters that contain semantically similar keywords, where each keyword cluster expresses a single intent, a corpora analysis system is able to more efficiently infer, induce, and/or determine a user's intent from their conversational dialogue. While the above aspects could involve abstract ideas, the inventive concepts are not directed to such ideas standing alone. A long-standing problem with corpora analysis systems is how to quickly, efficiently, and reliably determine the intent of the author of a conversational dialogue (corpora). The above aspects are directed to technically improving the speed, efficiency, and reliability, while reducing the cost in processing and memory of determining user intent from conversational dialogue.

Even if additional features of the above aspects, when viewed individually, are considered generic computer and networking functions, an inventive concept exists because of the unconventional and non-generic combination of known elements, including converting the extracted keywords from a corpora into ordered AMO triplets to create keyword clusters that contain semantically similar keywords, where each keyword cluster expresses a single intent, enabling more efficient and reliable determinations of a user's intent. Furthermore, the various features and limitations of the above aspects should confine any abstract ideas to a particular and practical application of those abstract ideas such that the combination of features is not a well-understood, routine or conventional activity. The above comments should apply to any other aspects described herein.

DETAILED DESCRIPTION

Figure 1:
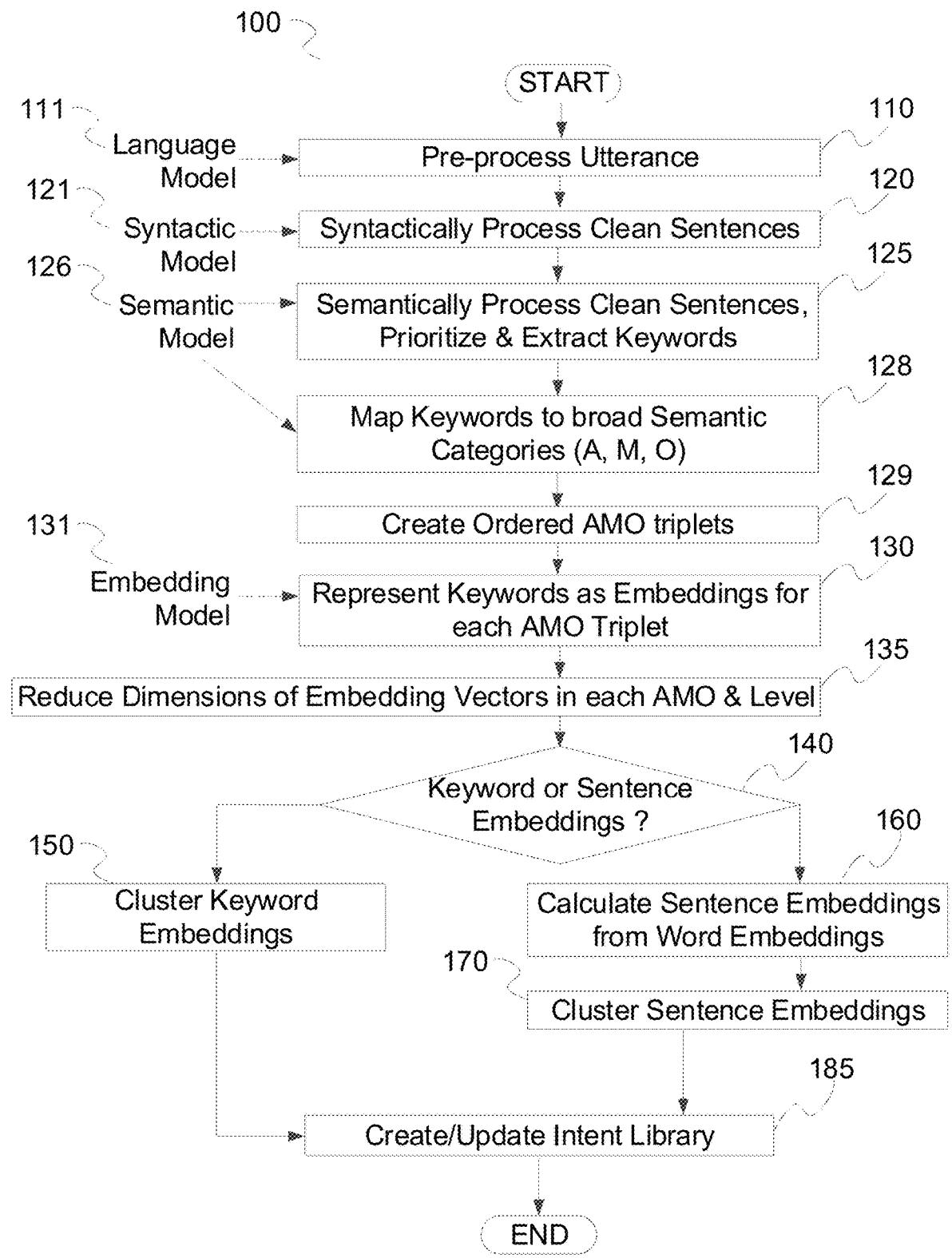
FIG. 1 shows a flowchart of a methodology for automatically processing user utterances to induce intents and create or populate user intent libraries.

The word "exemplary" is used herein to mean "serving as an example, instance, or illustration". Any implementation described herein as "exemplary" is not necessarily to be construed as preferred or advantageous over other implementations.

The acronym "IVR" is intended to mean "Interactive Voice Response".

The acronym "NLU" is intended to mean "Natural Language Understanding".

The acronym "ASR" is intended to mean "Automatic Speech Recognition".

The acronym "DM" is intended to mean "Dialogue Manager".

The acronym "PSTN" is intended to mean "Public Switched Telephone Network".

The acronym "PLMN" is intended to mean "Public Land Mobile Network".

The acronym "VAD" is intended to mean "Voice Activity Detector".

The acronym "UI" is intended to mean "User Interface".

The acronym "OS" is intended to mean "Operating System".

The term "mobile device" may be used interchangeably with "client device" and "device with wireless capabilities".

The term "user" may be used interchangeably with "regular user" and "ordinary user" and "speaker". It may also be used to mean "caller" in a telephone or VOIP call or conferencing session, "user of an application" or "user of a service", and "participant" in a text chat, audio chat, video chat, email, audio-conference or video-conference session.

The term "system" may be used interchangeably with "device", "apparatus", and "service", except where it is obvious to a reader of ordinary skill in related art that these terms refer to different things, as this is apparent by the context of the discussion in which they appear. Under any circumstance, and unless otherwise explicitly stated or implicitly hinted at in the description, these four terms should be considered to have the broadest meaning i.e. that of encompassing all four.

The present invention addresses a technical problem of automatically inducing user intent libraries from unlabeled dialogue data. An intent library includes semantically homogeneous groups of user utterances, i.e. surface linguistic expressions that may be uttered or typed by users when interacting with a human operator or a computer system. Each of these groups implicitly captures the semantics of a user intent and can optionally be mapped to an explicit semantic description of the intent, i.e., a description of the semantic components of the intent. That is, each intent description clusters words and phrases conveying similar meanings in a single (common) semantic abstraction.

In some implementations, the present invention offers a solution for more accurate, faster, domain agnostic, automatic creation of user intent libraries, which can be used to accurately and efficiently induce user intent in real time.

One solution proposed by the present systems and methods involves no or minimal human intervention, while being scalable (with respect to the languages and the domains it supports) and cost-efficient to operate. Furthermore, the use of the systems and methods disclosed herein does not alter the usual user routine when verbally or textually interacting with a computer-based system. A user routine may include, for example, the user speaking (or typing) in natural language, potentially using jargon, non-useful words like "ehm" etc., or engaging in a natural language conversation with a human, or computer system, without having to utter a predefined text like a training text. In other words, a typical user routine is intuitive to (most) users and this routine is not interrupted or altered by the use of the proposed innovative solution.

The present systems and methods can be used in a variety of business domains involving customer service/support applications (e.g. banking, e-commerce, telecommunications, healthcare, etc.) and can be integrated with a variety of systems like, for example, voice recognition and processing systems, Automatic Speech Recognition (ASR), Interactive Voice Response (IVR) systems, Dialogue Management (DM) systems, text-based DMs, automated customer support systems, search engines, text processing systems, user interaction systems, and any systems using voice or text interaction to service a user request and perform an action (e.g. for data access and processing, control of an external system, etc.).

Intent Induction

FIG. 1 shows a high-level flowchart of a methodology or process for automatically processing user utterances to induce intents and create or populate user intent libraries. Methodology 100 starts with a corpus of written or spoken user utterances in the context of a dialogue. Such corpus may include text typed by the user in a chat box or text produced by processing user's speech via an ASR system. In the former case, the corpus may also contain punctuation marks, emoticons, and special characters. In the latter case, the corpus may also contain ASR tags created during the conversion of speech to text by an ASR system or module.

The methodology includes the following steps, starting by using linguistic knowledge to structure raw corpus data.

A user's utterance includes words that are semantically contentful and others that relate to non-linguistic aspects of communication. The latter usually contain no useful information for detecting the user's intent. Consider two versions of an example utterance acquired (a) from a chat bot corpus, (b) from an ASR-transcribed corpus:

(a) hey, my name is Daniel Howard ☺ need help plz . . . wanna know my last balance . . . & can you guys help me pay my bill online plz (b) hey _COU_ my name is daniel howard _SP_ need help please _SP_ wanna know my last balance _HES_ and can you guys help me pay my bill online BRE_ please The ASR tags in (b) mark the following non-linguistic information:
_COU_: cough
_SP_: short pause
_HES_: hesitation
_BRE_: breathing A pre-processing step 110 is used to remove tokens from the corpus that add "noise" to the intent induction task. In an exemplary implementation, this can be achieved using word dictionaries and language models 111 developed for a single spoken language, as well as simple heuristics with the addition of terminology and jargon that may be used by the user or the operator. Word dictionaries and language models identify words that possess a linguistic value (i.e. higher than "0" value, say "1" for example). All words defined in a language possess a value with the exception of words that are not generally accepted (i.e. are regarded as not to exist) and which are of zero or no linguistic value. In yet another exemplary implementation, such dictionaries and language models may combine two or more spoken languages. By means of example, rules may be applied to remove words (e.g. "ehm", "gr", "mmm", "ergutaretmd", etc.) that are not found in standard or customized monolingual or multilingual word dictionaries or are not recognized by language models. Rules may also remove symbols such as emoticons, tags or code snippets, and they will replace abbreviated word forms or symbols with full (proper) word forms (e.g. "plz" "please", "&" "and").

Corpus preprocessing may also involve the use of off-the-shelf (pre-trained) models to identify sentence boundaries (sentence segmentation) and perform co-reference resolution (e.g. in a sentence such as "I wanna know my balance and pay it", the system should identify that the word "it" refers to "balance"). These tasks are critical for structuring user utterances using the sentence(s) they may contain, and for identifying links between entities across sentences. The latter are essential for understanding the content of the expressed request(s).

The output of the pre-processing step 110 is one or more sentences containing sequences of tokens (words) including punctuation, starting at a Sentence Start (SS) and ending at a Sentence End (SE) (control characters), lacking any ASR tags, emoticons, and abbreviations. For above example, the output is the following ("S" stands for "Sentence"):

S-1: [SS] hey, my name is daniel howard [SE]
S-2: [SS] need help please [SE]
S-3: [SS] want to know my last balance and [SE]
S-4: [SS] can you guys help me pay my bill online please [SE]

The clean sentences are fed to a syntactic processing module (i.e. some kind of syntactic parser using a syntactic model 121) in step 120, whose output is a representation of the grammatical structure of the sentence, including the grammatical properties of tokens and binary relations between them. In an exemplary implementation, a dependency parsing model may be used. Dependency parsing is a syntactic parsing paradigm representing sentence structure in terms of binary relations between "heads" and "dependents" (i.e. words that modify "heads"). Each token is identified on the basis of (i) a part-of-speech (POS) tag, (ii) the "head" token, on which it depends, and (iii) a tag describing the type of dependency between the two tokens. A dependency parser provides an approximation of the semantic (meaning) dependencies in a sentence.

An example of dependency parsing is shown below ("S" stands for "Sentence"):

S-1: ['hey', 'my', 'name', 'is', 'daniel', 'howard']
POS ['UH', 'PRP$', 'NN', 'VBZ', 'NNP', 'NNP']
HEAD ['is', 'name', 'is', 'is', 'howard', 'is']
DEPENDENCY ['intj', 'poss', 'nsubj', 'ROOT', 'compound', 'attr']
S-2: ['need', 'help', 'please']
POS ['VBP', 'NN', 'VB']
HEAD ['need', 'need', 'need']
DEPENDENCY ['ROOT', 'dobj', 'intj']
S-3: ['want', 'to', 'know', 'my', 'last', 'balance', 'and']
POS ['VBP', 'TO', 'VB', 'PRP$', 'JJ', 'NN', 'CC']
HEAD ['want', 'know', want, 'balance', 'balance', 'know', 'want']
DEPENDENCY ['ROOT', 'aux', 'xcomp', 'poss', 'amod', 'dobj', 'cc']
S-4: ['can', 'you', 'guys', 'help', 'me', 'pay', 'my', 'bill', 'online', 'please']
POS ['MD', 'PRP', 'NNS', 'VB', 'PRP', 'VB', 'PRP$', 'NN', 'RB', 'VB']
HEAD ['help', 'guys', 'help', 'help', 'pay', 'help', 'bill', 'pay', 'pay', 'pay']
DEPENDENCY ['aux', 'nmod', 'nsubj', 'ROOT', 'nsubj', 'ccomp', 'poss', 'dobj', 'advmod', 'intj']

Figure 2A:
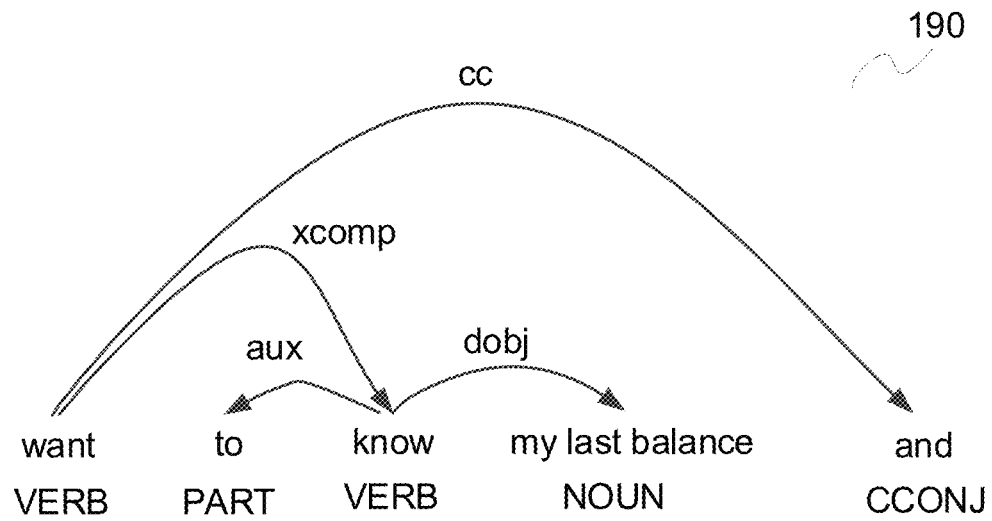
FIG. 2A shows an example of a graphical representation of a syntactic structure.
Figure 2B:
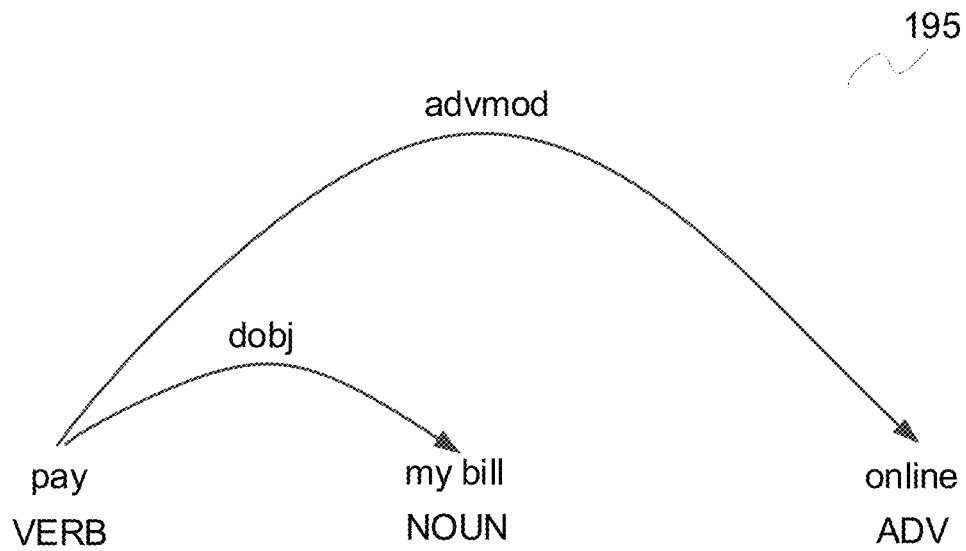
FIG. 2B shows another example of a graphical representation of a syntactic structure.

FIGS. 2A and 2B show an example graphical representations of the dependency parsing output. In particular, FIG. 2A shows the graphical representation of the syntactic structure for "want to know my last balance and" 190, and FIG. 2B shows a graphical representation of the syntactic structure for "pay my bill online" 195.

In sentence 190, the verb "know" depends on verb "want" (i.e. "want" is the head of "know"), while the particle "to" and the noun phrase "my last balance" both depend on the verb "know".

In sentence 195, the noun phrase "my bill" and the adverbial "online" depend on the verb "pay".

An output of the syntactic (dependency) parser 120 is used as input to a semantic module, which first aims to prune each sentence by selecting a set of keywords (at step 125), assumed to convey its core meaning. Step 125 includes a reduction operation on the length of the sentence. Keyword selection is based on a semantic model 126 that prioritizes a subset of the grammatical relations (dependencies) returned by the syntactic parser in the previous step 120 as semantically relevant for intent induction. For example, selecting direct objects (dobj) of verbs, adjectival modifiers (amod) of nouns, and adverbial modifiers (advmod) of verbs results in pruning the sentences in the previous paragraph, i.e., reducing them to the following lists of keywords:

S-2: help
S-3: know, last, balance
S-4: help, pay, bill, online

For each binary relation (dobj, amod, advmod, etc.), the model specifies whether one or both tokens should be added to the list of keywords. For instance, in the verb phrase "know my last balance", "know" and "balance" are both selected keywords. In an exemplary implementation, post-processing of the selected keywords may eventually result in an even shorter list. For example, in "need help" the model gives priority to the noun ("help") removing the verb ("need") from the words with meaning of potential interest. The verb "need" is removed during keyword post-processing, in that it belongs to a finite set of pseudo-modal verbs in English. This kind of knowledge may be added to the model to restrict the list of selected keywords.

While extracting keywords from a sentence, the model keeps track of the dependencies between them. Therefore, a more accurate representation of the above lists of keywords is the following. In square brackets, we show the dependencies between keywords.

S-2: [-, help],
S-3: [know, balance], [last, balance]
S-4: [help, pay], [pay, bill], [pay, online]
("-" indicates an empty dependency, i.e. the token ("need") on which there is a dependency has been discarded from selected keywords).

The semantic module subsequently maps 128 each one of the extracted keywords to one of three coarse-grained semantic categories: Actions, Modifiers, and Objects. On the basis of their POS tags and the POS tags of their heads, keywords tagged with the selected grammatical relations are identified as instances of one of these keyword types. Hence the lists of extracted keywords can be coded as lists of keyword types and the binary relations between keywords can be projected to binary relations between keyword types, as shown below.

S-2: [-, Action],
S-3: [Action, Object], [Modifier, Object]
S-4: [Action, Action], [Action, Object], [Action, Modifier]

Finally, the semantic module is responsible for building a structured representation for each sentence based on the set of binary relations attested between keyword types in the sentence. The binary relations between keyword types are combined into Triplets of Actions, Modifiers and Objects (AMO) 129. The AMO Triplets are the building blocks of the intent descriptions (templates) that will be created. Each AMO triplet corresponds to at least one user intent. By means of example, "know", "last", and "balance" form an instance of an AMO Triplet, which in turn corresponds to the Account_Balance_Inquiry intent.

For each sentence, AMO Triplets are populated with the extracted keywords. Not all keyword types in an AMO triplet need to be populated. In a fully populated Triplet, one of the keywords has a relation to both other keywords. E.g. "balance" has a relation to both "know" and "last"; "pay" has a relation to both "bill" and "online".

Keywords of the same type are represented in separate AMO Triplets, regardless of whether they are connected with a binary relation or not. Therefore, the number of AMO Triplets for a sentence equals the maximum number of any one of the keyword types attested in the sentence. For example, if one (1) Modifier, two (2) Objects, and three (3) Actions are attested in a given sentence, the model will build three (3) AMO Triplets.

Table 1a-c contains the six binary relations in step 125 that are combined in the following three AMO Triplets in step 128. Each AMO Triplet in step 128 is identified in terms of the order in which it appears in the sentence.

TABLE 1.a

| | AMO triplet representing S1. | |
|---|---|---|
| | 1 | 2 |
| A | help | |
| M | | |
| O | | |

TABLE 1.b

| | AMO triplet representing S2. | |
|---|---|---|
| | 1 | 2 |
| A | know | |
| M | last | |
| O | balance | |

TABLE 1.c

| | AMO triplet representing S3. | |
|---|---|---|
| | 1 | 2 |
| A | help | pay |
| M | | online |
| O | | bill |

The next step continues by using Vector Space Models to process structured corpus representations.

The semantic module described above converts unstructured corpus sentences to structured sets of ordered AMO Triplets by first keeping or discarding tokens from the utterance on the basis of semantic relevance, then mapping the selected tokens (keywords) to semantic types (keyword types), and combining keyword types to semantic (AMO) structures. The entire corpus is converted to a chart of AMO Triplets 129 populated with keywords in the order in which they appear in corpus sentences. Each ordered AMO Triplet specifies a representation level. Thus "help", "know", and "help" in Tables 1.a-1.c (respectively) populate Actions of the first representation level, while "pay" populates Actions of the second representation level.

AMO Triplets for individual corpus sentences (Tables 1.a-1.c) are merged in a single corpus representation (Table 2). Blanks represent the cases where no keyword and corresponding relation was found.

TABLE 2

Merging AMO Triplets to represent entire corpus

| | Level 1 | | | Level 2 | | |
|---|---|---|---|---|---|---|
| | S1 | S2 | S3 | S1 | S2 | S3 |
| Actions | help | know | help | | | pay |
| Modifiers | | last | | | | online |
| Objects | | balance | | | | bill |

The keywords are then projected to an n-dimensional embeddings space, i.e. are turned in to n-dimensional vectors 130, i.e. word embeddings representations, using an embeddings model 131. Word embeddings are a baseline technique for adding pretrained lexical semantic knowledge to NLP applications. That is, keywords are projected to a semantic space (the embeddings space) and are mapped to vectors of real numbers representing distributional properties of words in large language data. Word vectors, in effect, quantify lexical meaning in terms of the linguistic contexts in which words appear. In an exemplary implementations, off-the-shelf pre-trained vector space models are used, including (but not limited to) word2vec (e.g., trained on Google News), Glove vectors (e.g., trained on Wikipedia and Common Crawl), subword fastText vectors (e.g., trained on Wikipedia and Common Crawl), and sense2vec vectors (e.g., trained on reddit). In yet another exemplary implementation, in-house models may be re-trained and tuned to the corpus data available for a specific domain or use case (e.g. banking data acquired from the call center of a specific financial institution). All the above steps are speaker agnostic and thereby do not alter the usual speaker routine during interaction with a human agent or a computer system (i.e., the speaker does not have to use predefined key sentences or words during his interaction and he does not have to train the system by reading a pre-defined training text or by another mean).

In yet another exemplary implementation, after projection to the embeddings space 130, dimensionality reduction is performed 135 on word vectors, using some state-of-the-art algorithm such as Principal Component Analysis—explained variance. Dimensionality reduction is performed on the sets of vectors that populate Actions, Modifiers and Objects in each of the sets of ordered AMO Triplets, i.e. separately for Actions, Modifiers and Objects at each AMO level. This entails that the same token does not necessarily have the same vector representation across all AMO Triplets in which it may appear. For example, the word 'balance' will have a different representation within the same embeddings space depending on whether it appears as a verb, a modifier or an object and what is more, also depending on whether it was the first/second/third action found within the utterance. Therefore, pre-trained vectors are informed by the semantic types of keywords and their occurrences within ordered AMO Triplets.

In an alternative exemplary implementation, sentence embeddings 160 are computed using the keyword embeddings 135 (or the keyword embeddings 130 in a variation of this exemplary implementation [not shown in FIG. 1]) of the identified keywords in each sentence. A variety of different methods can be used to compute sentence embeddings in step 160. In the next paragraphs, two of these methods are described.

In the first method, corpus sentences are represented using a concatenation of two vectors. The first vector is calculated by max pooling the n dimensions of the word embeddings of the identified keywords of the sentence. The second vector is calculated as the weighted average of the word embeddings of the identified keywords of the sentence, where the weights are calculated using the frequencies of words in the English Wiki dump.

In the second method, corpus sentences are represented using the weighted centroids average of the word vectors of the keywords of the sentence. The weights are determined by the type of each of the keywords, assigning different weights (a first weight) to Actions, (a second weight to) Modifiers, and (a third weight to) Objects. Combining these averages, we end up with the representation of the meaning of each sentence as a whole.

Unsupervised Clustering of Vector Representations

An unsupervised clustering algorithm is subsequently applied on either one of the two types of embeddings, i.e. keyword embeddings 150 or sentence embeddings 170, computed above. An optional step of assigning intent labels or numerals to the keyword embeddings 150 or clustered sentence embeddings 170 may be added in alternative exemplary implementations. Methodology 100 ends by creating or updating an intent library in step 185 with the computed intent clusters (clustered keyword embeddings 150 or clustered sentence embeddings 170).

In what follows, we describe two alternative implementations for clustering vectors, and additionally one implementation that combines the other two implementations.

Figure 3:
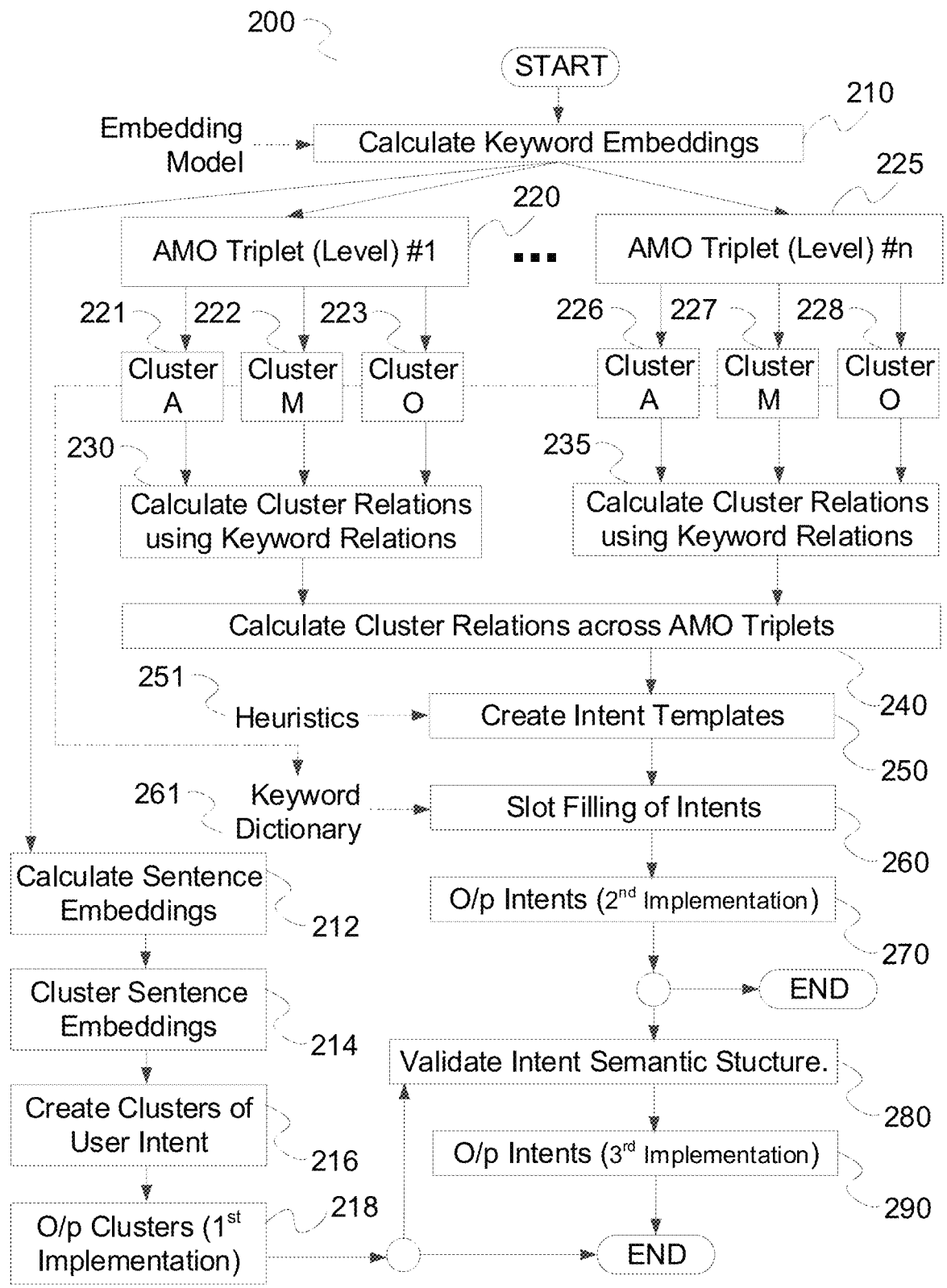
FIG. 3 shows a flowchart of a methodology for calculating multi-level cluster relations.

FIG. 3 shows a high-level flowchart of a methodology for calculating multi-level cluster relations. In a first exemplary implementation, clustering operates on sentence embeddings 160 or 212 calculated from keyword embeddings 130 or 210 for each corpus sentence. Sentence embeddings 212 are clustered 214, to create clusters of user intent 216 (explained below), and the clusters of user intent of the $1^{st}$ exemplary implementation are outputted 218. The clustered sentences (corresponding to the clusters of step 214) are assumed to trigger the same intent, yet the semantic components of the intent are implicit. Such clusters can be used for validation of the explicit semantic descriptions that are produced by the method described in the second exemplary implementation below, i.e. for validating relations between keyword clusters.

In a second exemplary implementation, a multi-level clustering methodology is used to cluster keyword embedding vectors (130 or 135, 210) for each sentence, using keyword types and the levels of AMO Triplets. In particular, a model clusters keyword vectors populating the Action Type, the Modifier Type, and the Object Type, and distinguishes Actions in the first AMO Triplet level from Actions in the second AMO Triplet level, and so on. That is, each keyword type and each AMO Triplet level specifies a clustering level.

Keyword clusters group together semantically similar (i.e. near synonymous, or found within similar/synonymous contexts) words. For instance, tokens such as "know", "ask", and "learn" may be grouped together in a cluster that captures an "inquiry" meaning. Such clusters are equivalent to sets of word dictionaries mapping words to distinct meanings (i.e. word senses).

Assume that our corpus includes the following sentences:
1. pay my bill online
2. wanna know how to pay my bill
3. wanna know how I can cancel my bill
4. pay my bill
5. need help with paying my bill and getting a receipt 6. need help about my last balance and about paying my bill online The selected keywords and their relations are shown below:
1. [pay, bill], [pay, online]
2. [know, pay], [pay, bill]
3. [know, cancel], [cancel, bill]
4. [pay, bill]
5. [help, paying], [paying, bill], [getting, receipt]
6. [help, balance], [last, balance], [help, pay] [pay, bill], [pay, online]

These keywords are structured in the ordered AMO Triplets of Table 3:

TABLE 3

Example AMO triplet levels for selected keywords.

|   |    | Level-1 | Level-2 | Level-3 |
|---|----|---------|---------|---------|
| A | S1 | pay     |         |         |
|   | S2 | know    | pay     |         |
|   | S3 | know    | cancel  |         |
|   | S4 | pay     |         |         |
|   | S5 | help    | pay     | get     |
|   | S6 | help    | pay     |         |
| M | S1 | online  |         |         |
|   | S2 |         |         |         |
|   | S3 |         |         |         |
|   | S4 |         |         |         |
|   | S5 |         |         |         |
|   | S6 | last    | online  |         |
| O | S1 | bill    |         |         |
|   | S2 |         | bill    |         |
|   | S3 |         | bill    |         |
|   | S4 | bill    |         |         |
|   | S5 |         | bill    | receipt |
|   | S6 | balance | bill    |         |

The clusters of Actions in each of the three clustering levels, i.e. as keywords appear in each of the ordered AMO Triplets in the corpus, are the following:

TABLE 4

Example Clusters of Actions for the 3 levels of selected keywords.

|   | Level-1 | Level-2 | Level-3 |
|---|---------|---------|---------|
| A | Payment-cluster (pay) | Payment-cluster (pay) | Receive-cluster (get) |
|   | Inquiry-cluster (know) | Cancellation-cluster (cancel) | |
|   | Help-cluster (help) | | |
| M | Online-cluster (online) | Online-cluster (online) | |
|   | Previous-cluster (last) | | |
| O | Bill-cluster (bill) | Bill-cluster (bill) | |
|   | Balance-cluster (balance) | | |

The relations between keywords, projected to relations between keyword types, are then projected to relations between clusters in keyword types. Applying methodology 200 from its start, we begin with the calculation of keyword embeddings 210 (refer to steps 130 and 135 in FIG. 1). For each AMO triplet, of levels 1 . . . n (220 . . . 225), clustering is done for 220, 225 of reduced dimension keyword embeddings 135. This clustering is done for Actions 221 and 226; Modifiers 222 and 227 and Objects 223 and 228, respectively.

These cluster relations 230 and 235 are binary relations between word clusters in various levels of AMO triplets. Such clusters are derived from keyword relations received from the syntactic parser in steps 120, 125, 128, and 129.

Clusters connected by means of some projected relation are the building blocks for constructing intent descriptions. Simple heuristics 251 are used to convert relations between the keyword types in AMO Triplets 230, 235 and across AMO Triplets 240 into intent templates 250. For instance, in XML pseudocode, the relation between an Action cluster 221 and an Object cluster 223, with either the Action cluster 221 or the Object cluster 223 connected with a Modifier cluster 222, or not, is modeled with the following intent template. Note that entities and relations marked with "?" are optional (i.e. not required in the intent definition). The intent template below includes an optional Modifier and captures two optional dependencies: a Modifier may be dependent on an Object via an "amod" (adjectival modification) relation, or it may be dependent on an Action via an "advmod" (adverbial modification) relation. Obligatory entities (i.e., Action and Object) are connected via an obligatory "dobj" (direct object) relation.

```
<intent name="11">
    <constraintSet>
        <constraint name="001">
            <entity name="Action" value=" "/>
            <entity name="Object" value=" "/>
            <entity name="?Modifier" value=" "/>
        <relation name="dobj" argument="Action,Object"/>
        <relation name="?amod" argument="Modifier,Object"/>
        <relation name="?advmod" argument="Modifier,Action/>
        </constraint>
    </constraintSet>
</intent>
```

In the intent description above, constraint "001" requires the existence of an Action and an Object, and allows for the presence of a Modifier, without requiring it. Note that an intent may be described with more than one constraint such as the above. Alternative representations of intent descriptions may be used instead of the above exemplary intent template.

Slot filling 260 in the intents is implemented by filling empty positions in the intent templates using tokens in keyword clusters (i.e. dictionaries updated with the output of clustering steps 221, 222, 223, . . . , 226, 227, 228) and the resulting intents are outputted 270. A slot filling model automatically generates a list of intents with slots filled from the dictionaries. For example, the following intent captures a "request of bill payment" by means of two intent constraints depicting possible entity configurations. Note that in another exemplary embodiment, tokens filling the entity slots may be lemmatized and slots may eventually be filled with all possible forms of the corresponding lemmas.

```
<intent name="112">
    <constraintSet>
        <constraint name="001">
            <entity name="Action" value="pay"/>
            <entity name="Object" value="bill,invoice,statement"/>
            <relation name="dobj" argument="Action,Object/>
    </constraint>
        <constraint name="002">
```

```
        <entity name="Action" value="pay"/>
        <entity name="Object" value="bill,invoice,statement"/>
        <relation name="pobj" argument="Action,Object/>
      </constraint>
    </constraintSet>
</intent>
```

Two other intents are exemplified below: one intent captures "incorrect bill payment" ("124") and the other intent captures "request for payment reversal" ("312").

```
<intent name="124">
  <constraintSet>
    <constraint name="001">
      <entity name="Action" value="pay,payoff"/>
      <entity name="Object" value="bill,invoice,statement"/>
      <entity name="Modifier" value="wrong,incorrect"/>
    <relation name="amod" argument="Modifier,Object/>
    </constraint>
  </constraintSet>
</intent>
<intent name="312">
  <constraintSet>
    <constraint name="001">
      <entity name="Action" value="cancel,reverse"/>
      <entity name="Action" value="pay,payoff"/>
    <relation name="dobj" argument="Action,Action/>
    </constraint>
    <constraint name="002">
      <entity name="Action" value="cancel,reverse"/>
      <entity name="Action" value="pay,payoff"/>
    <relation name="pobj" argument="Action,Action/>
    </constraint>
  </constraintSet>
</intent>
```

Types of cluster relations may be grouped together on the basis of the keyword types and the word clusters they connect. For example, if two types of relations hold between the same keyword types (e.g. between Actions and Objects), instantiated by the same word clusters (e.g. Payment and Statement), then these cluster relations can be merged into a single relation.

dobj(ACTION, OBJECT)
pobj (ACTION, OBJECT)
dobj(Payment, Statement)
pobj(Payment, Statement)

This relation is converted into the intent "Payment.Bill" and captures utterances like:

I want to pay my bill.
I want to make a payment on my last statement.

where "pobj" marks a prepositional object, i.e. an argument of (dependent on) a verb or noun introduced with a preposition.

As shown above, intent descriptions in the above second exemplary implementation are associated with explicit semantic components (i.e. keyword type slots and tokens that may fill them) and corpus sentences in which the relations between these components are attested.

Each one of the sentences of step 125 is associated with an intent in the intent library induced from relations between keyword clusters 221-223, 226-228 may additionally be associated with a sentence cluster 170, 214.

In a third exemplary implementation, intent utterances acquired from the first exemplary implementation (step 218) are used to validate the intents induced from the second implementation (step 270), and vice versa. For example, if the sentences mapped to a certain intent induced from the second implementation 270 are mapped to a single sentence cluster from the first implementation 218, we may validate (step 280) the semantic structure of the intent from the second implementation 270 and output intent 290. If intent sentences are mapped to more than one clustered sentence embedding 214, then the clustered sentence embedding 214, depending on the weights on the basis of which they have been computed, may indicate more coarse-grained intents, or they may be used to validate inheritance relations between intents.

The use of the third exemplary implementation may increase the accuracy and performance of the calculation method resulting in improved intent libraries.

In a first example, the sentences below are in the same sentence cluster that was computed on weighted Objects. They correspond to distinct intents in the second implementation, which may however be considered to be consolidated:

card was lost
card was stolen

In a second example, the sentences below are in the same sentence cluster that was computed on weighted Objects. They correspond to distinct intents in the second implementation, which should be connected with appropriate intent inheritance relations capturing the fact that they all refer to requests related to "account balance":

find account balance
transfer account balance
wrong account balance
new account balance Intent inheritance and intent relations can be created manually or automatically using simple rules. Strictly speaking, they are outside the scope of the invention.

Figure 4:
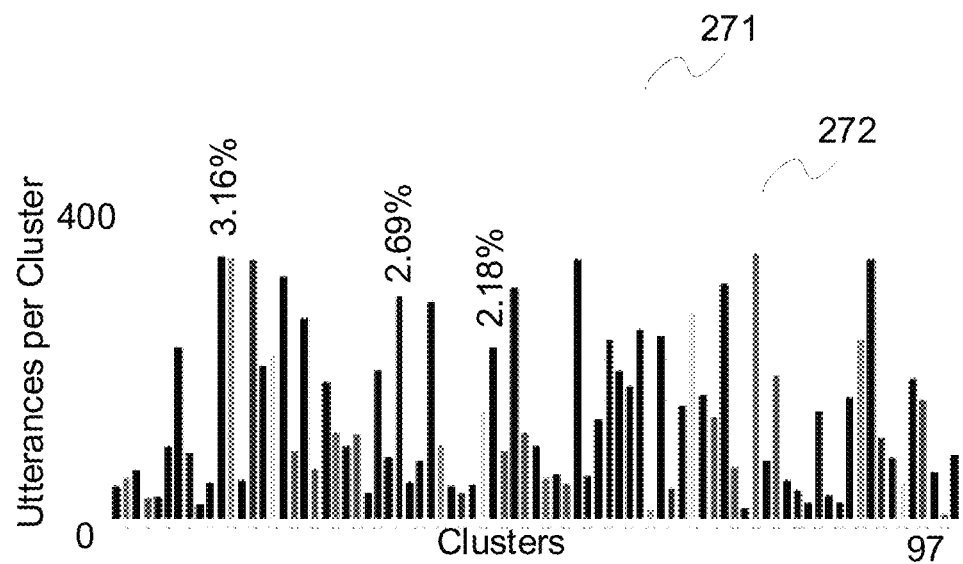
FIG. 4 shows an example extract of clusters for the United States banking domain for 100,000 utterances not readily associated with an existing user intent.

FIG. 4 shows an example extract of clusters for the United States banking domain for 100,000 utterances not readily associated with an existing user intent. The "y" axis shows the number of utterances per cluster while the "x" axis shows the cluster number (i.e. a randomly assigned identification number). Clusters 271 are shown in different shades with the number of utterances they contain marked as a percentage 272 of the total number of 100,000 utterances. For better visibility only the percentages 272 for a subset of the clusters 271 are shown.

Below the 2-dimensional graph are listed an example subset 273 of the above clusters together with labels of intent.

Figure 5:
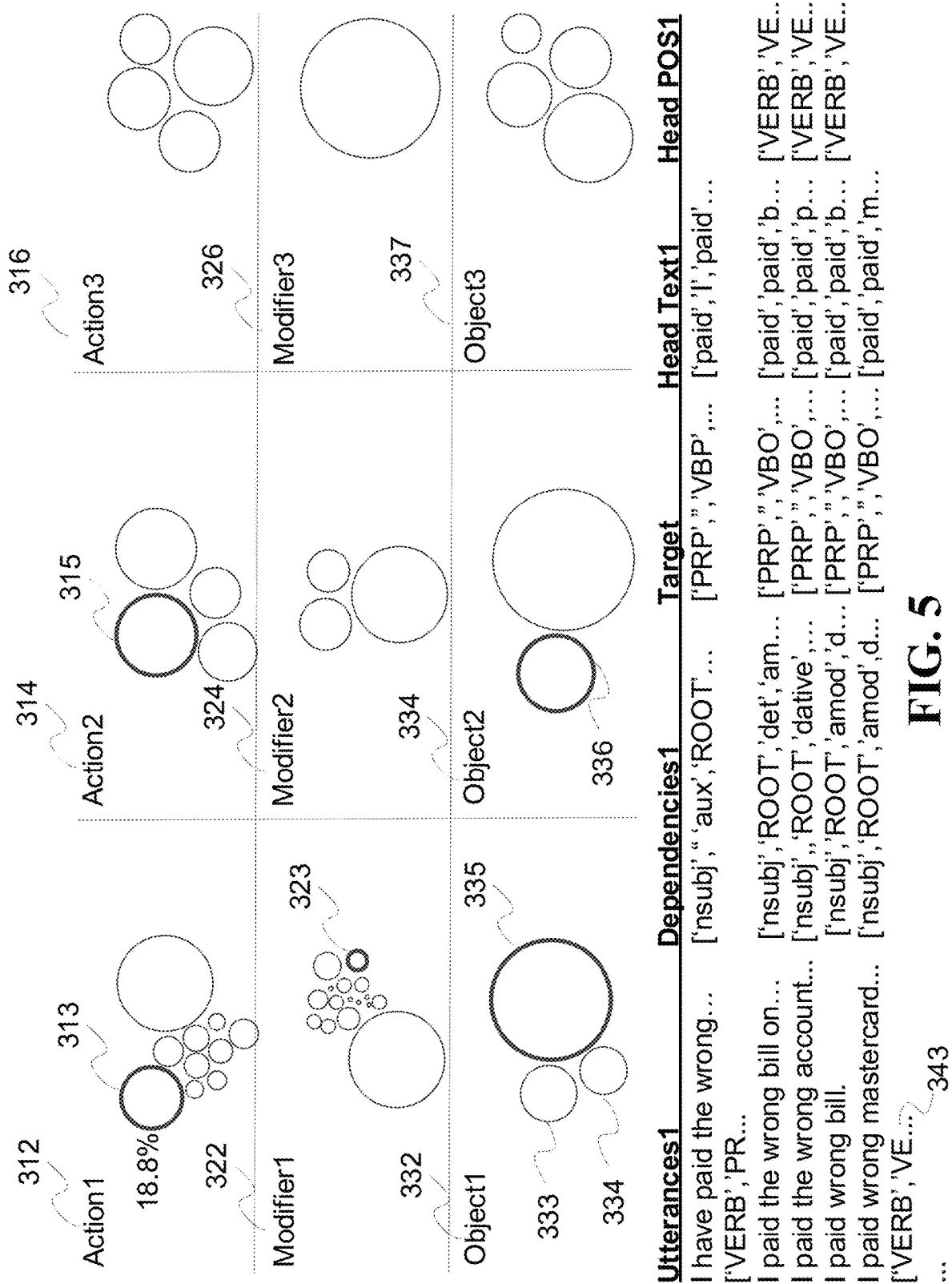
FIG. 5 shows an example set of AMO clusters and the application of an Action Filter.

FIG. 5 shows an example set of AMO clusters and the application of an Action Filter. In this example a corpus is filtered with the Action1 cluster 312 with 18.8% 313 appearance frequency (labeled "pay" —not visible due to space restrictions). The Modifier 1 322 and Object 1 332 clusters that are related to Action 1 312 cluster are then viewed. A Modifier1 cluster labeled "incorrect" 323 (the label "incorrect" is not shown) is then selected. Subsequently, three Object clusters 333, 334, 335 related to Modifier 1 323 cluster are selected, while most frequently the Object cluster labeled "bill" is selected. Utterances 343 that exemplify the chosen filters are shown below the clusters: one can distinguish "paid the wrong bill", "paid to the wrong account", "paid wrong mastercard". On the second clustering level, further filtering of the data by selecting an Action2 314, Modifier 2 324 or Object 2 334 cluster and receiving the corresponding relations attested in the corpus is done. Notice, for example, that there is an Action 2 314 cluster labeled "cancel" 315 and an Object 2 334 cluster labeled "emt" (i.e., email money transfer) (the labels "cancel" and "emt" are not shown) 336: these could potentially be combined with the first clustering level relations in utterances such as "paid wrong mastercard and want to cancel the emt"—to be confirmed by filtering the data. The AMO triplet is completed with Action 3 316, Modifier 3 326, and Object3 337. The remaining clusters in FIG. 5 are shown for a more complete understanding but are not labeled or enumerated for visual simplicity of the figure.

Intent induction for Taking Actions in Computer Systems and Applications

Figure 6:
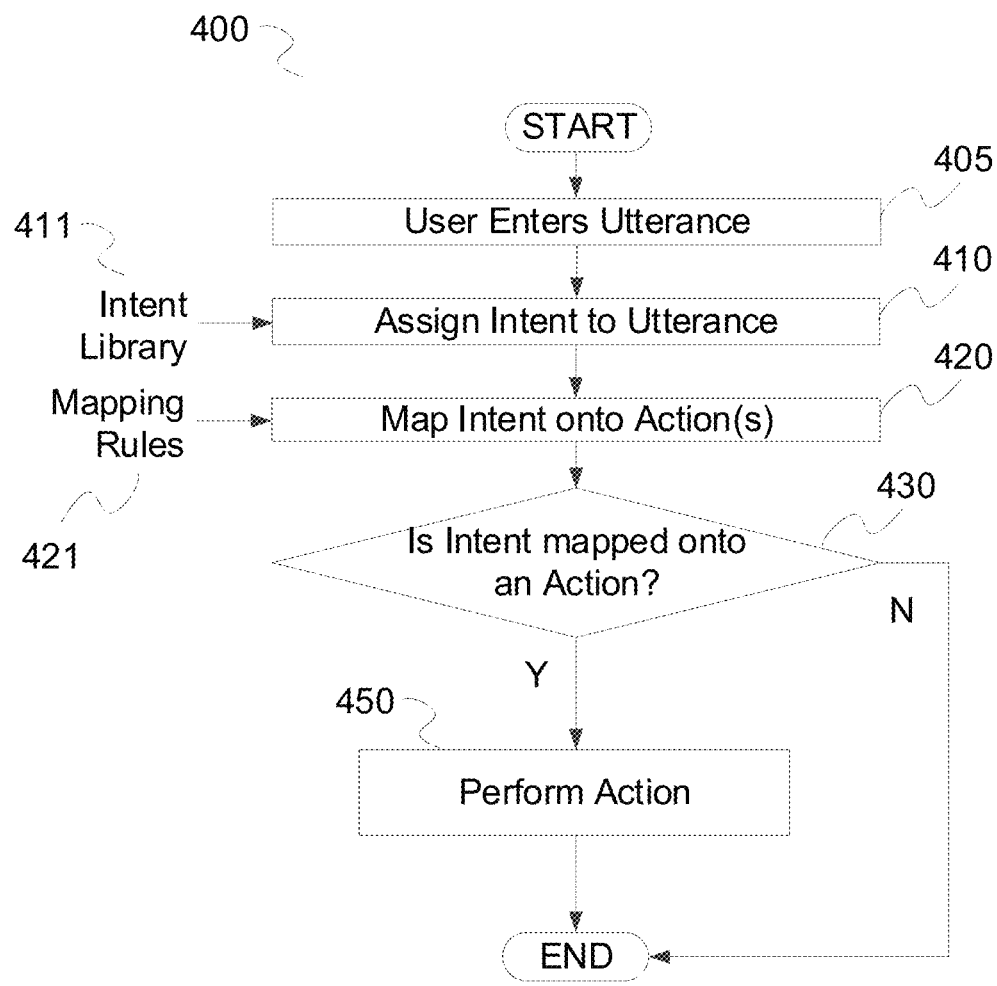
FIG. 6 shows how an intent library interfaces with external systems for intent induction and with systems that perform an action based on the induced intent.

FIG. 6 shows how an intent library interfaces with external systems for intent induction and with systems that perform an action based on the induced intent. Methodology 400 starts with an utterance entered 405 (i.e. spoken or typed) by the user. One of the intents in a library 411 constructed with methodology 200 is assigned 410 to utterance 405. The task of assigning the correct intent to an unseen utterance is a classification task addressing the similarity of the new utterance to utterances associated with individual intents stored in intent library 411. This task may be tackled via standard machine learning algorithms, known to those of ordinary skill, for classification or using the semantic descriptions of intents in the created intent library 411 (i.e. the collection of all intents induced with the present innovative solution and the intents already populating the same intent library prior to the addition of the new intents induced by the present innovative solution). The latter entails that whenever keywords filling the keyword type and the relation slots in an intent description are detected in a particular utterance, this intent will be assigned to the utterance.

Development of or interfacing with a specific application involves mapping 420 each intent in library 411 to a specific action using mapping rules 421. When an intent is mapped to an action 430, the corresponding action is performed 450 by the connected external system or application (not shown). If the mapping of the intent to an action is not successful 430 for whatever reason (e.g. no intent can be associated with an action using mapping rules 421, or incomplete, broken, or empty rules 421 are supplied to step 420, or other), then no action is performed.

Figure 7:
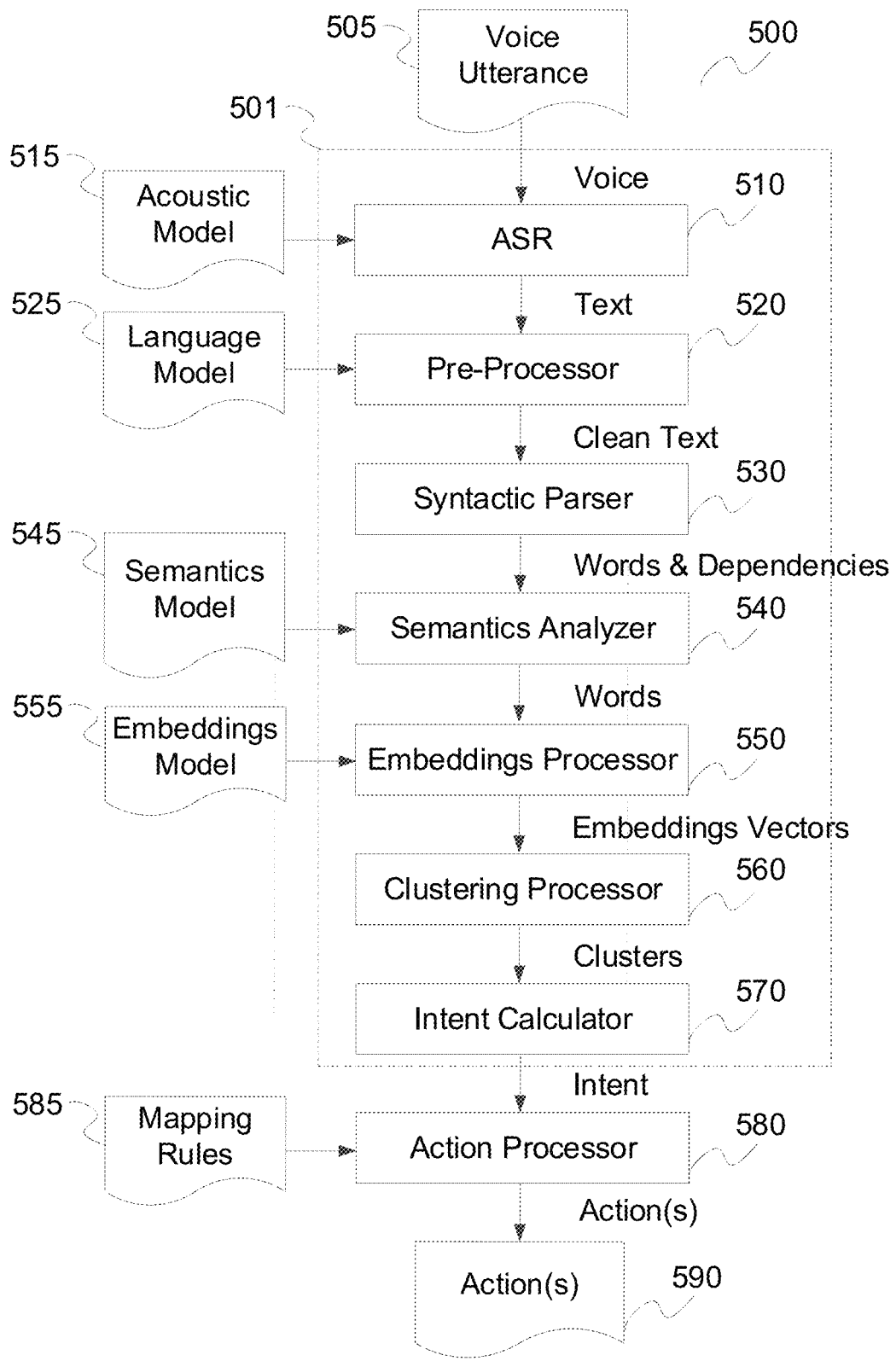
FIG. 7 shows a hardware diagram for an intent induction and action system 500.

FIG. 7 shows a high-level hardware diagram for an intent induction and action system 500. Intent induction system 501 is made up of an ASR module 510, a preprocessor module 520, a syntactic parser (e.g. dependency) module 530, a semantics analyzer module 540, an embeddings processor module 550, a clustering processor module 560, and an intent calculator module 570.

Intent induction system 501 has the goal of creating intent libraries. System 501 achieves its goal by processing a very large corpus (or corpuses) offline and induces a number of intents, utterances that fulfill these intents and precise intent descriptions (i.e. descriptions of the semantic components of the intents).

ASR module 510 is fed with a voice utterance 505 and an acoustic model 515. The ASR 510 coverts the input voice into text using acoustic model 515. In an alternative use case where the user input is text (e.g. in a chat interface), ASR 510 is optional or is not used. The text output of ASR 510, is fed to pre-processor 520, which uses a language model 525 to produce a clean text without garbage words, emoticons, punctuations, etc. The clean text is fed to syntactic (e.g. dependency) parser 530 to produce words and dependencies (e.g. binary relations) between them. The output of syntactic parser 530 is fed to semantics analyzer 540, which in turn uses a semantics model 545 to extract a set of keywords. The semantic analyzer 540 also maps keywords to broad semantic categories (i.e. actions, modifiers and objects) and creates ordered (i.e. prioritized) AMO triplets, where each AMO triplet describes an intent and contains at least one keyword. The output of semantics analyzer 540 is fed to embeddings processor 550, which uses an embeddings model 555 to convert the extracted keywords in the ordered AMO triplets into keyword embedding vectors and reduces the dimensions of the keyword embedding vectors in each of the action, modifier and object semantic category and in each order of the AMO triplets.

The reduced dimension vectors are then fed to clustering processor 560, which creates keyword or sentence clusters. Each keyword cluster contains semantically similar keywords. Clustering processor 560 outputs intent clusters to intent calculator 570. Intent calculator 570 induces cluster relations, creates intent templates, fills slots in the intent templates and optionally validates the intent semantic structure. In alternative exemplary implementations intent calculator 570 also optionally assigns labels to intent clusters. Intent calculator 570 stores in an intent library the intent clusters and the intent the clusters represent and outputs the induced intent.

Having created or updated the intent library or libraries, they are stored locally, remotely, on the cloud, or at any type of centralized or distributed storage according to the specific exemplary implementation used. These libraries are then used at run time when a user's intent is induced from a live (or other) utterance with the help of the contents of the pre-constructed and stored library or libraries.

At runtime a new utterance is received. The intent induction system assigns the received intent to one of the intents in the library (or libraries) of intents (refer to [0083] for more information).

The induced intent is output to action processor 580 which uses mapping rules 585 to map intent onto one or more actions and outputs each action 590 for use by one or more external systems. Any action mapped into an intent is performed by a "third party system".

The modules of system 500 can be combined into new modules each containing two or more of modules of system 500. Alternatively, all or some module(s) of system 500 may be assigned different tasks of combinations of tasks of those previously described, without altering the scope of protection of the present innovative solution, as this is obvious to any reader of ordinary skill in related art. Also, any of the modules of system 500 may be implemented in any architecture known in prior art. It is obvious to a reader of ordinary skill in related art that modules 500 can be implemented in hardware, software, firmware or a combination of the three.

Figure 8:
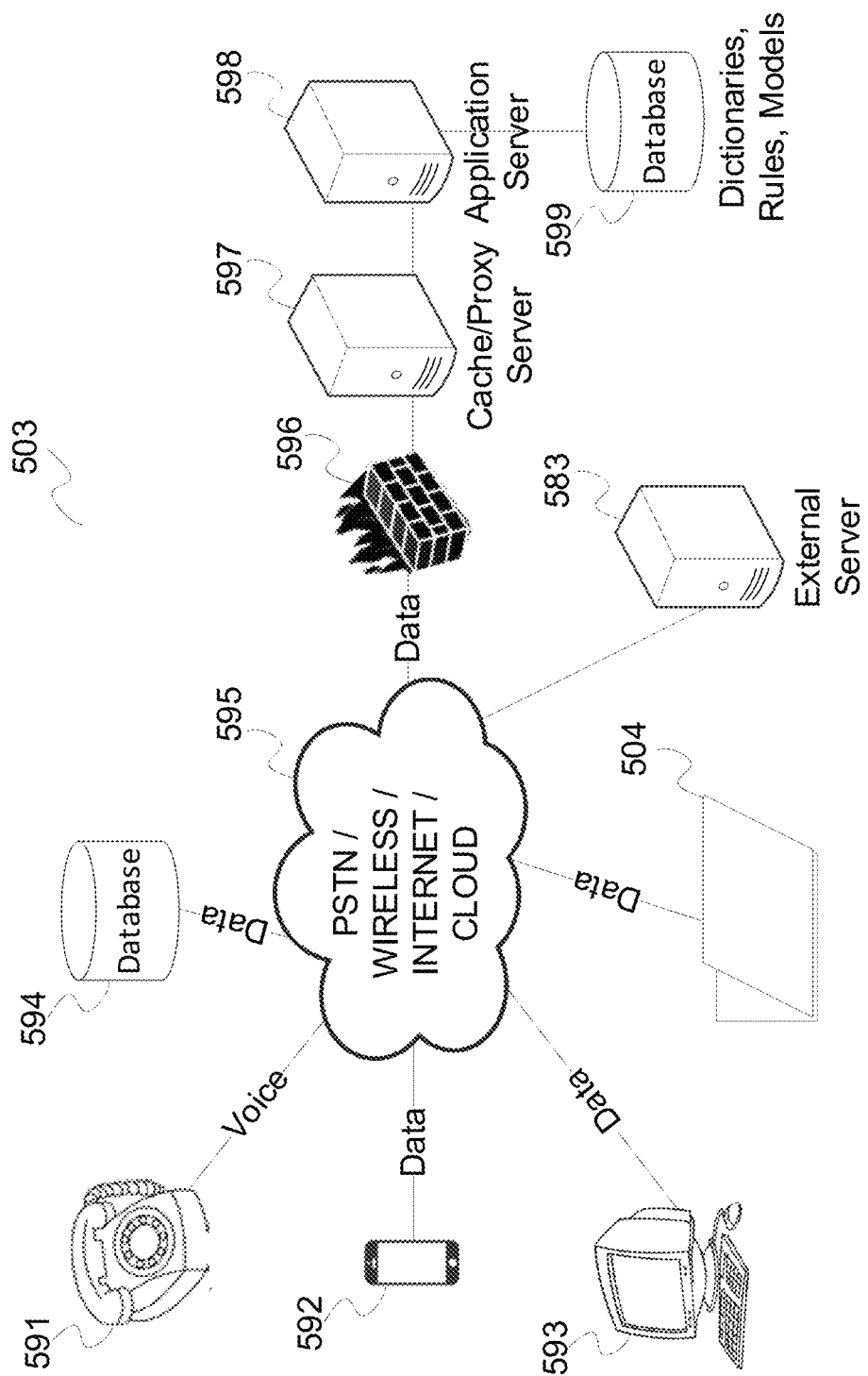
FIG. 8 shows an example implementation of an intent induction system and its connections to enable the flow of data.

The models, the outputs of each module and actions 590 may be implemented in any known data format including but not limited to eXtensible, Markup Language (XML), American Standard Code for Information Interchange (ASCII), or other and may be stored and retrieved from distributed memory, databases, cloud storage or other, while stored at a single storage location or split between storage locations. They may also be encoded and/or encrypted in any available format with any available algorithm implemented in hardware, software, firmware or a combination thereof FIG. 8 shows an example implementation of an intent induction system and its connections to enable the flow of data. Systems and devices 503 are interconnected to provide the necessary flow of data. An application server 598 is used in this exemplary implementation of the intent induction system. In alternative exemplary embodiments, hardware implementations of the intent induction system may be used using purpose-built or dedicated software and firmware.

Application server 598 is connected to a database 599 which stores dictionaries, rules and models. Application server 598 is also connected to an optional cache server or proxy server 597 which communicates via an optional firewall 596 to the outside using an available data network 595. Network 595 may take the form of a wireless or wired network (e.g. Wireless Fidelity (WiFi), cellular, Ethernet, or other) and be part of any network infrastructure like the Internet, the Cloud, proprietary network or a combination of any of them. Application server 598 implements the present innovative solution and communicates with a device used by a user to (ultimately) access the application server 598.

A user may connect to network 595 via any computing device or system, including laptop 504, desktop computer 593, tablet or mobile phone 592 (smartphone or simple device) or similar. Users may also connect via fixed telephones 591, both digital and analogue, connected to a digital telephony infrastructure or a Public Switched Telephone Network (PSTN) infrastructure which is then connected to digital data infrastructures. Third party or remote databases 594 may also be connected to network 595 and which can be accessed by application server 598 or other dedicated or specialized hardware used for the implementation of the intent induction system.

In a variation of the above exemplary implementation of system 503, the user device 592, 593, 504 is equipped either with special software, or one or more special hardware processors or combination of the special software and hardware that implement the present innovative solution. As a result the present innovative solution is implemented at the user device 592, 593, 504 without the need to application server 598 and even without the need of cache server 597 and database 599. If database 599 is not used, then dictionaries, rules and models are stored in the user device 592, 593, 504.

Regardless of which of the above two exemplary implementations are used, the output of the application of the present innovative solution, i.e. intents are stored either in database 599 or at the user device 592, 593, 504 to create or update intent dictionaries.

After induction of user intent (with methodologies 100, 200 and the intent dictionaries), the user intent is mapped either at application server 598 or at the user device 592, 593, 504 onto an action to be taken. This action is then sent either by the application server 598 or by the user device 592, 593, 504 to an external server 583. External server 583 may be an application server (e.g. forming part of a banking system, a search engine, a hospital system, etc.) or other type and is connected to network 595.

Figure 9A:
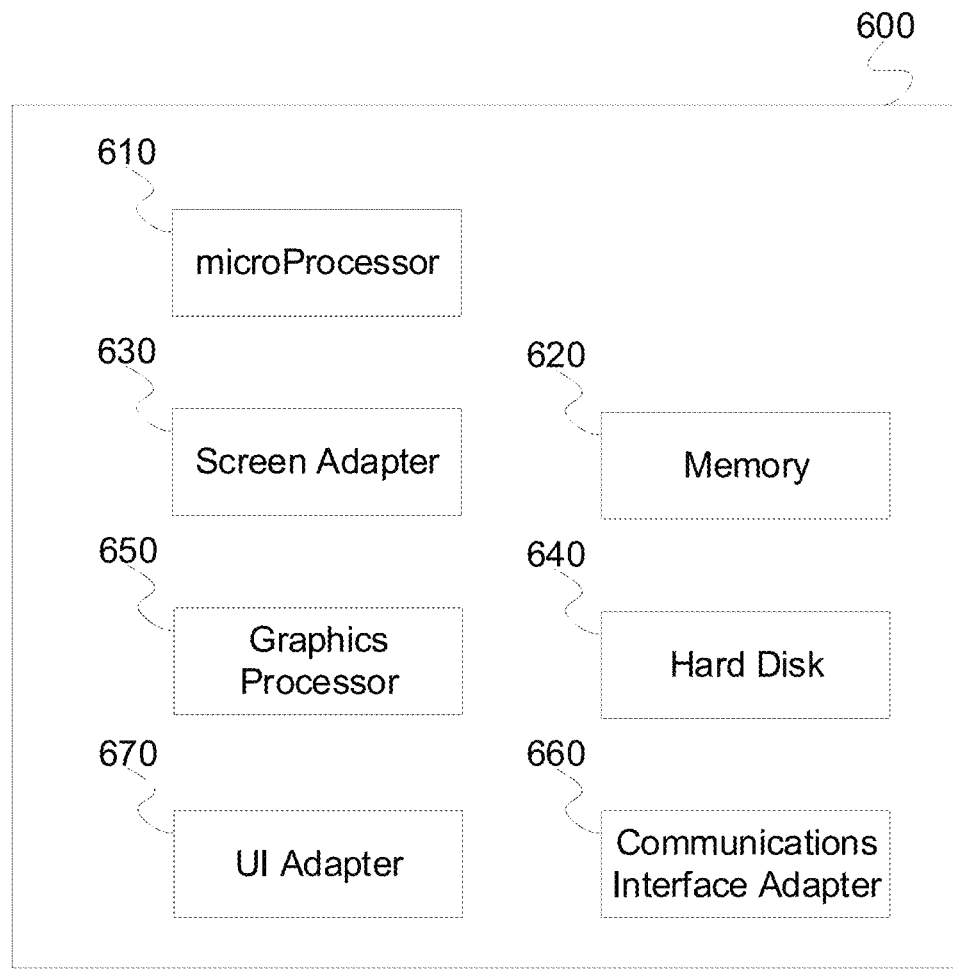
FIG. 9A shows the hardware architecture of an application server or other hardware implementing the intent induction system.

Example Hardware Architecture of an Application Server or Other Hardware Implementing the Intent Induction System FIG. 9A shows the basic hardware architecture of an application server or other hardware implementing the intent induction system. Application Server or other hardware 600 comprises a microprocessor 610, a memory 620, a screen adapter 630, a hard-disk 640, a graphics processor 650, a communications interface adapter 660, and a UI adapter 670. Application Server 600 may also contain other components which are not shown in FIG. 9A or lack some of the components shown in FIG. 9A. Components 630, 640, 650, 670 are optional.

Figure 9B:
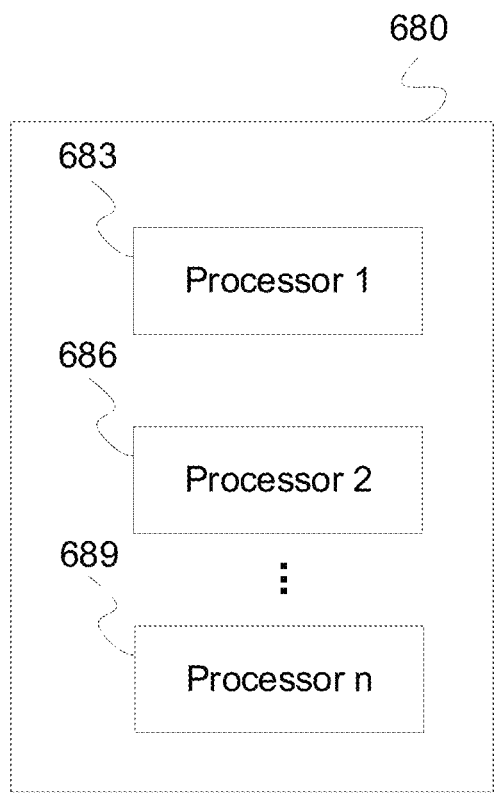
FIG. 9B shows a system for intent induction using multiple processors.

FIG. 9B shows a system for intent induction using multiple processors. System 680 has more than one processors; processor_1 683, processor_2 686, . . . , processor_n 689. These processors are connected via a bus (not shown) and may function in a first exemplary implementation in a peer-to-peer setup and in a second exemplary implementation as a master-slave setup where one of the three processors acts as master and the other processors act as slaves. Processors 683, 686, 689 may be configured each to execute one or more modules 500.

The use of processors 683, 686, 689 allows faster operation times for the intent induction system and allows concurrent use of multiple users while allowing easy scale up even at hot operation.

In other exemplary implementations, processor 683, 686, 689 may execute modules 500 in a redundant mode to enable uninterrupted intent induction system operation in the event of hardware failure of any of processors 683, 686, 689. The use of processors 683, 686, 689 allows faster operation times for the intent induction system.

Figure 9C:
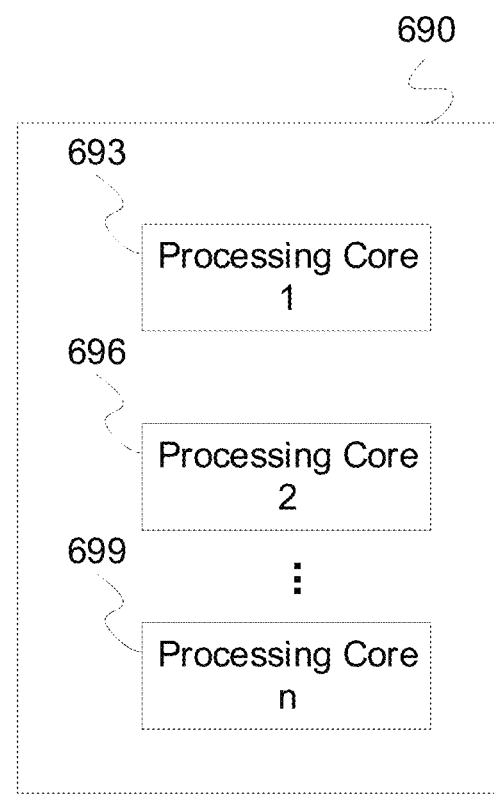
FIG. 9C shows a system for intent induction using multiple processing cores.

FIG. 9C shows a system for intent induction using multiple processing cores. System 690 has more than one processors; processor_1 693, processor_2 696, . . . , processor_n 699. These processing cores are connected via a bus (not shown) and may function in a first exemplary implementation in a peer-to-peer setup and in a second exemplary implementation as a master-slave setup where one the three processing cores acts as master and the other processors act as slaves. Processing cores 693, 696, 699 may be configured each to execute one or more modules 500.

The use of processing cores 693, 696, 699 allows faster operation times for the intent induction system and allows concurrent use of multiple users while allowing easy scale up even at hot operation.

In other exemplary implementations, processor 693, 696, 699 may execute modules 500 in a redundant mode to enable uninterrupted intent induction system operation in the event of hardware failure of any of processing cores 693, 696, 699. The use of processing cores 693, 696, 699 allows faster operation times for the intent induction system.

In another exemplary implementation, each or some of processors 683, 686, 699 have multiple processing cores like 693, 696, 699.

Example Software Components of an Application Server

Figure 10:
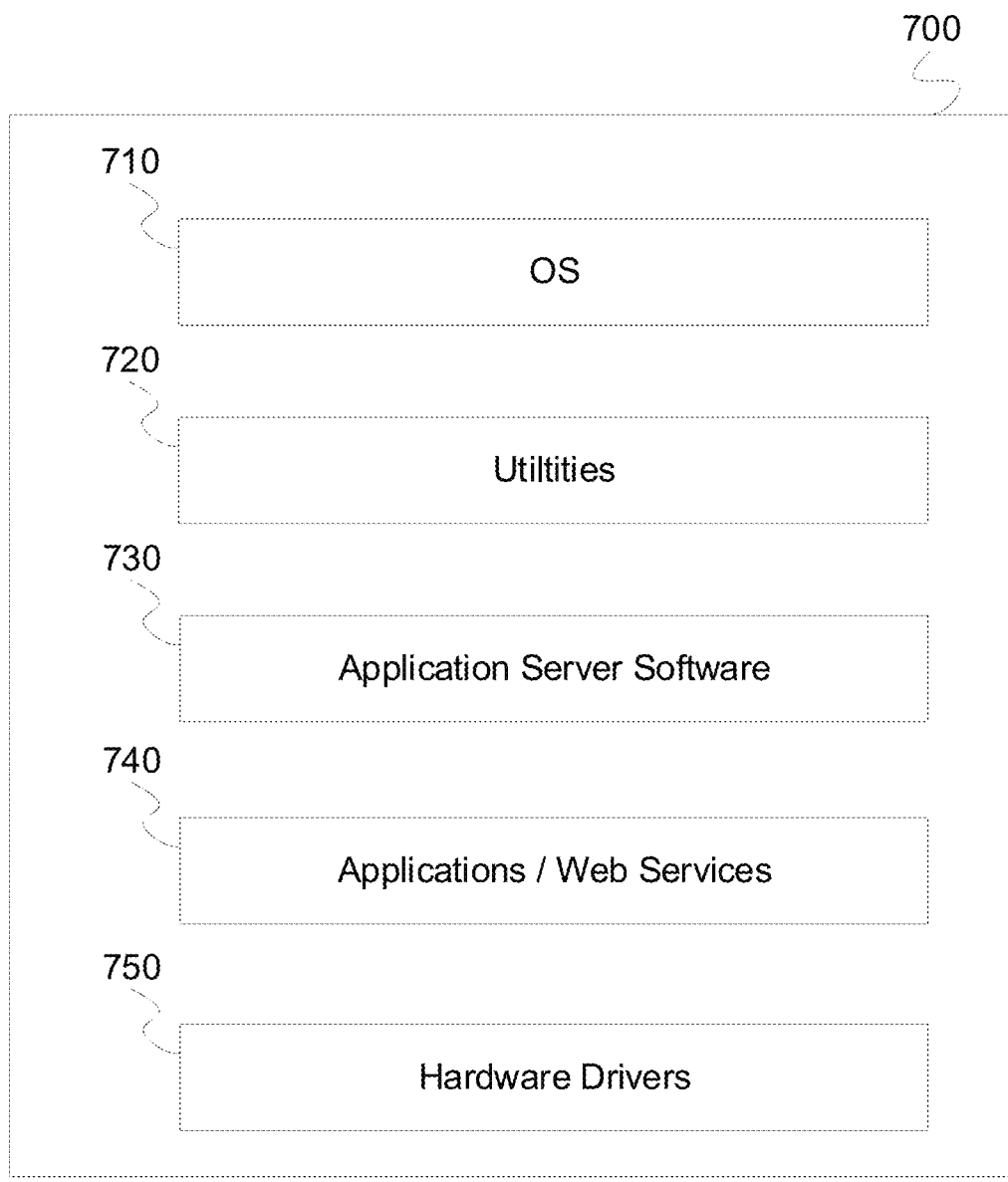
FIG. 10 shows the basic software components 700 running on an application server.

FIG. 10 shows the basic software components 700 running on an application server. They comprise an Operating System (OS) 710, Utilities 720, an Application Server Software 730, at least one Application or Web Service 740, and at least one Hardware driver 750. Additional software components may run at the application server while some of those shown in FIG. 10 may be omitted. One or more of software components 700 may be instantiated more than once to help speed up operation of the intent induction system and support easy scale up to cater for the needs of several concurrent users.

Example Software Components of a Device

Figure 11:
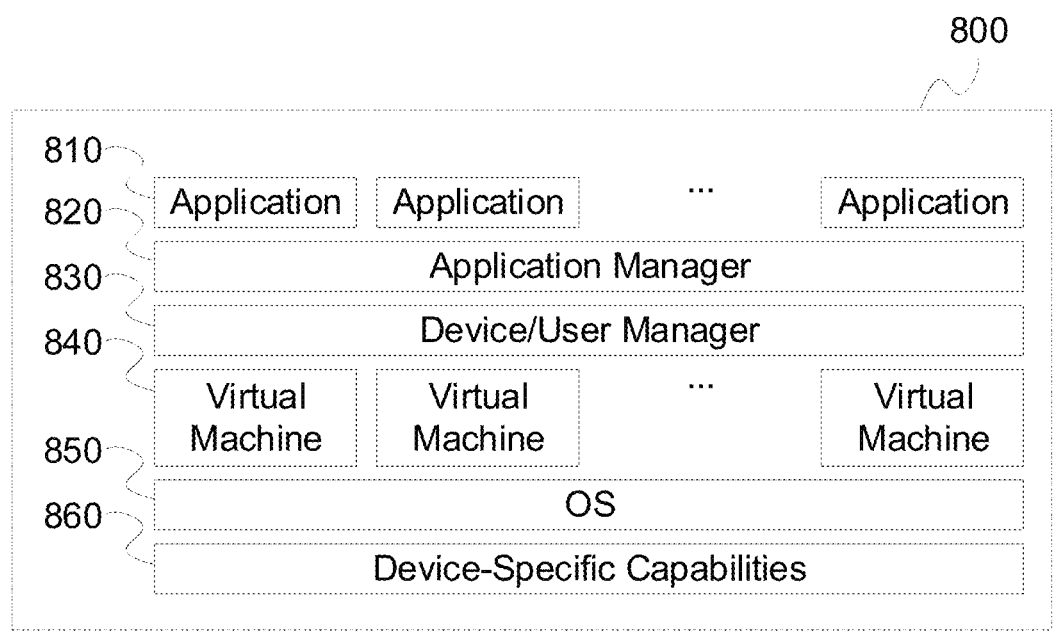
FIG. 11 shows the main Software Components of a device.

FIG. 11 shows the main Software Components of a device. At the lowest layer of software components 800 are Device-Specific Capabilities 860 that is the device-specific commands for controlling the various device hardware components. Moving to higher layers lie an OS 850, Virtual Machines 840 (like a Java Virtual Machine or other), Device/User Manager 830, Application Manager 820, and at the top layer, Applications 810. These applications may access, manipulate, transform and display data and communicate with other devices and may use any protocol, standard or proprietary, used by the devices they run on or other devices or systems they connect to.

The above exemplary implementations are intended for use either as a standalone system or method in any conceivable scientific and business domain, or as part of other scientific and business methods, processes and systems.

The above exemplary implementations descriptions are simplified and do not include hardware and software elements that are used in the implementations but are not part of the current invention, are not needed for the understanding of the implementations, and are obvious to any user of ordinary skill in related art. Furthermore, variations of the described method, system architecture, and software architecture are possible, where, for instance, method steps, and hardware and software elements may be rearranged, omitted, or new added.

Various implementations of the invention are described above in the Detailed Description. While these descriptions directly describe the above implementations, it is understood that those skilled in the art may conceive modifications and/or variations to the specific implementations shown and described herein unless specifically excluded. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s).

The foregoing description of a preferred embodiment and best mode of the invention known to the applicant at this time of filing the application has been presented and is intended for the purposes of illustration and description. It is not intended to be exhaustive or limit the invention to the precise form disclosed and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out this invention, but that the invention will include all embodiments falling within the scope of the appended claims.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or any other device or apparatus operating as a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for updating an intent library, the system comprising:
    a syntactic parser arranged to process a sequence of word tokens and control characters of at least one sentence in a corpus and produce words and dependencies between the words;
    a semantic analyzer arranged to process the words and dependencies between the words for extracting a set of keywords and arranged to map the set of keywords to action (A), modifier (M) and object (O) semantic categories and create ordered AMO triplets;
    an embeddings processor arranged to convert the set of extracted keywords in the ordered AMO triplets into keyword embedding vectors and reduce the dimensions of the keyword embedding vectors in each of the action, modifier and object semantic categories and in each order of the AMO triplets;
    a clustering processor arranged to cluster the reduced dimension keyword embedding vectors, where each keyword cluster contains semantically similar keywords, and which keywords in a cluster express a single intent; and
    an intent calculator arranged to calculate cluster relations, create intent templates, fill empty positions in the intent templates, and store the intent clusters and the intents the clusters represent to the intent library.

2. The system of claim 1, further comprising a pre-processor arranged to eliminate words and marks that have no linguistic value from a corpus, and arranged to create the sequence of word tokens and pairs of sentence boundary control characters, where the corpus comprises at least one sentence.

3. The system of claim 1, where the intent calculator is further arranged to validate an intent semantic structure.

4. The system of claim 1, where the intent calculator is further configured to:
    assign intent labels to intent clusters, which labels are found in the intent library; and
    store the intent labels to the intent library.

5. The system of claim 1, where the pre-processor, the syntactic parser, the semantic analyzer, the embeddings processor, the clustering processor, and the intent calculator are implemented in one of an application server, a user device, a multi-processor system, a multicore-processor, and a multi-processor system where each processor is a multi-core processor.

6. The system of claim 1, further comprising:
    an action processor arranged to map each intent onto one or more actions and output each actions to at least one external system.

7. A server configured to cluster keywords comprising:
a communications interface arranged to received text from at least one of an automated speech recognition (ASR) module and a user interface, the text forming at least one sentence in a corpus; and
a processor arranged to:
syntactically parse a sequence of word tokens and control characters of the at least one sentence in the corpus to produce words and dependencies between the words;
semantically analyze the words and dependencies between the words for extracting a set of keywords and map the set of keywords to action (A), modifier (M) and object (O) semantic categories and create ordered AMO triplets;
convert the extracted set of keywords in the ordered AMO triplets into keyword embedding vectors and reduce the dimensions of the keyword embedding vectors in each of the action, modifier and object semantic categories and in each order of the AMO triplets; and
cluster the reduced dimension keyword embedding vectors, where each keyword cluster contains semantically similar keywords, and which keywords in a cluster express a single intent.

8. The server of claim 7, wherein the processor is further configured to:
i) eliminate words and marks that have no linguistic value from the corpus, and
ii) create the sequence of word tokens and pairs of sentence boundary control characters.

9. The server of claim 8, wherein the processor is further configured to calculate cluster relations, create intent templates, fill empty positions in the intent templates, and store the intent clusters and the intents the clusters represent to an intent library.

10. The server of claim 9, wherein the processor is further configured to:
assign intent labels to intent clusters, which labels are found in the intent library; and
store the intent labels to the intent library.

11. A computer implemented method for updating an intent library, the method comprising:
pre-processing a corpus to eliminate words and symbols that have no linguistic value, where the corpus comprises at least one sentence, and to create a sequence of word tokens and pairs of sentence boundary control characters;
syntactically processing the sequence of word tokens to produce a grammatical-syntactical representation of the at least one sentence in the corpus;
semantically processing the grammatical and/or syntactical representation of the at least one sentence in the corpus to extract a set of keywords;
mapping each extracted keyword in the set of extracted keywords to one of action (A), modifier (M) and object (O) semantic category;
representing the order of appearance of the set of extracted keywords as different levels of actions(A), modifiers(M) and objects(O);
calculating binary relations between the set of extracted keywords;
combining and prioritizing the binary relations into ordered AMO triplets, where each AMO triplet of the ordered AMO triplets describes one intent and contains at least one keyword;
converting the extracted keywords in the ordered AMO triplets into keyword embedding vectors;
mapping the set of extracted keywords in the ordered AMO triplets onto an embedding space, where each keyword in the set of extracted keywords is converted to an n-dimensional keywords embedding vector;
reducing the dimensions of the n-dimensional keyword embedding vector in each of the action, modifier and object semantic categories and in each of the ordered AMO triplets;
clustering the keyword embedding vectors, where each cluster contains semantically similar keywords;
creating cluster combinations, where each cluster combination represents a single intent; and
entering the cluster combinations into the intent library.

12. The method of claim 11, where the mapping depends on the keyword category and order of appearance in the sentence.

13. The method of claim 11, further comprising:
calculating sentence embedding vectors from the sentence's keyword embedding vectors, and reduced dimension keyword embedding vectors;
clustering the sentence embedding vectors, where each sentence cluster contains semantically similar sentences, which sentences in a cluster express a single intent; and
entering the sentence clusters into the intent library.

14. The method of claim 13, where each sentence embedding vector is calculated by concatenating:
a first vector which is the max pooling of the keyword embeddings of the sentence, and
a second vector calculated as the weighted average of the keyword embedding vectors of the sentence.

15. The method of claim 14, where the weights in the second vector are calculated using the frequencies of words in an English Wiki dump.

16. The method of claim 13, where each sentence embedding vector is calculated as the weighted centroids average of the keyword embedding vectors of the sentence.

17. The method of claim 16, where the weights applied to the centroids of the keyword embedding vectors are each selected so that:
a first weight is applied to keywords mapped onto the action semantic category;
a second weight is applied to keywords mapped onto the modifier semantic category; and
a third weight is applied to keywords mapped onto the object semantic category.

18. The method of claim 13, further comprising using the sentence clusters to validate the keyword clusters.

19. The method of claim 11 further comprising:
grouping cluster relations using the keyword types and the keyword clusters they connect;
converting the cluster relations into intents;
using heuristics to convert relations between keyword types in AMO triplets and across AMO Triplets into intent templates; and
filling empty positions in the intent templates with word tokens from intent dictionaries.

20. The method of claim 11, further comprising mapping the intent onto an action.

21. A non-transitory computer program product that causes a system to update an intent library, the non-transitory computer program product having instructions to:
pre-process a corpus to eliminate words and marks that have no linguistic value, where the corpus comprises at least one sentence, and to create a sequence of word tokens and pairs of sentence boundary control characters;

syntactically process the sequence of word tokens and pairs to produce a grammatical or syntactic representation of the at least one sentence in the corpus;

semantically process the grammatical or syntactic representation of the at least one sentence in the corpus to extract a set of keywords;

map each of the extracted keywords to one of action (A), modifier (M) and object (O) semantic category;

represent the order of appearance of the extracted set of keywords as different levels of actions(A), modifiers (M) and objects(O);

calculate binary relations between the extracted keywords;

combine and prioritize the binary relations into ordered AMO triplets, where each AMO triplet describes an intent and contains at least one keyword;

convert the extracted set of keywords in the ordered AMO triplets into keyword embedding vectors;

map the extracted set of keywords in the ordered AMO triplets onto an embedding space, where each keyword in the extracted set of keywords is converted to an n-dimensional embedding vector;

reduce the dimensions of the keyword embedding vectors in each of the action, modifier and object semantic categories and in each order of the AMO triplets;

cluster the keyword embedding vectors, where each keyword cluster contains semantically similar keywords;

create cluster combinations, where each clusters combination represents a single intent; and enter the cluster combinations into the intent library.

22. The non-transitory computer program product of claim 21, where the mapping depends on the keyword category and order of appearance in the sentence.

23. The non-transitory computer program product of claim 21, further comprising instructions to:

calculate sentence embedding vectors from the sentence's keyword embedding vectors, and reduced dimension keyword embedding vectors by one of (i) concatenating a first vector calculated by concatenating the keyword embeddings of the sentence, and a second vector calculated as the weighted average of the keyword embedding vectors of the sentence, where the weights in the second vector are calculated using the frequencies of words in an English Wiki dump, and (ii) from the weighted centroids average of the keyword embedding vectors of the sentence, where the weights applied to the centroids of the keyword embedding vectors are each selected so that (a) a first weight is applied to keywords mapped onto the action semantic category, (b) a second weight is applied to keywords mapped onto the modifier semantic category, and (c) a third weight is applied to keywords mapped onto the object semantic category;

cluster the sentence embedding vectors, where each sentence cluster contains semantically similar sentences, which sentences in a cluster express a single intent; and enter the sentence clusters into the intent library.

24. The non-transitory computer program product of claim 23, further comprising instructions to use the sentence clusters to validate the keyword clusters.

25. The non-transitory computer program product of claim 21 further comprising instructions to:

group cluster relations using the keyword types and the keyword clusters the cluster relations connect;

convert cluster relations into intents;

use heuristics to convert relations between keyword types in AMO triplets and across AMO Triplets into intent templates; and fill empty positions in the intent templates with word tokens from intent dictionaries.

* * * * *